March 27, 1956     Z. BLOCK ET AL     2,739,896
EDIBLE DUSTING COMPOSITION
Filed June 5, 1952
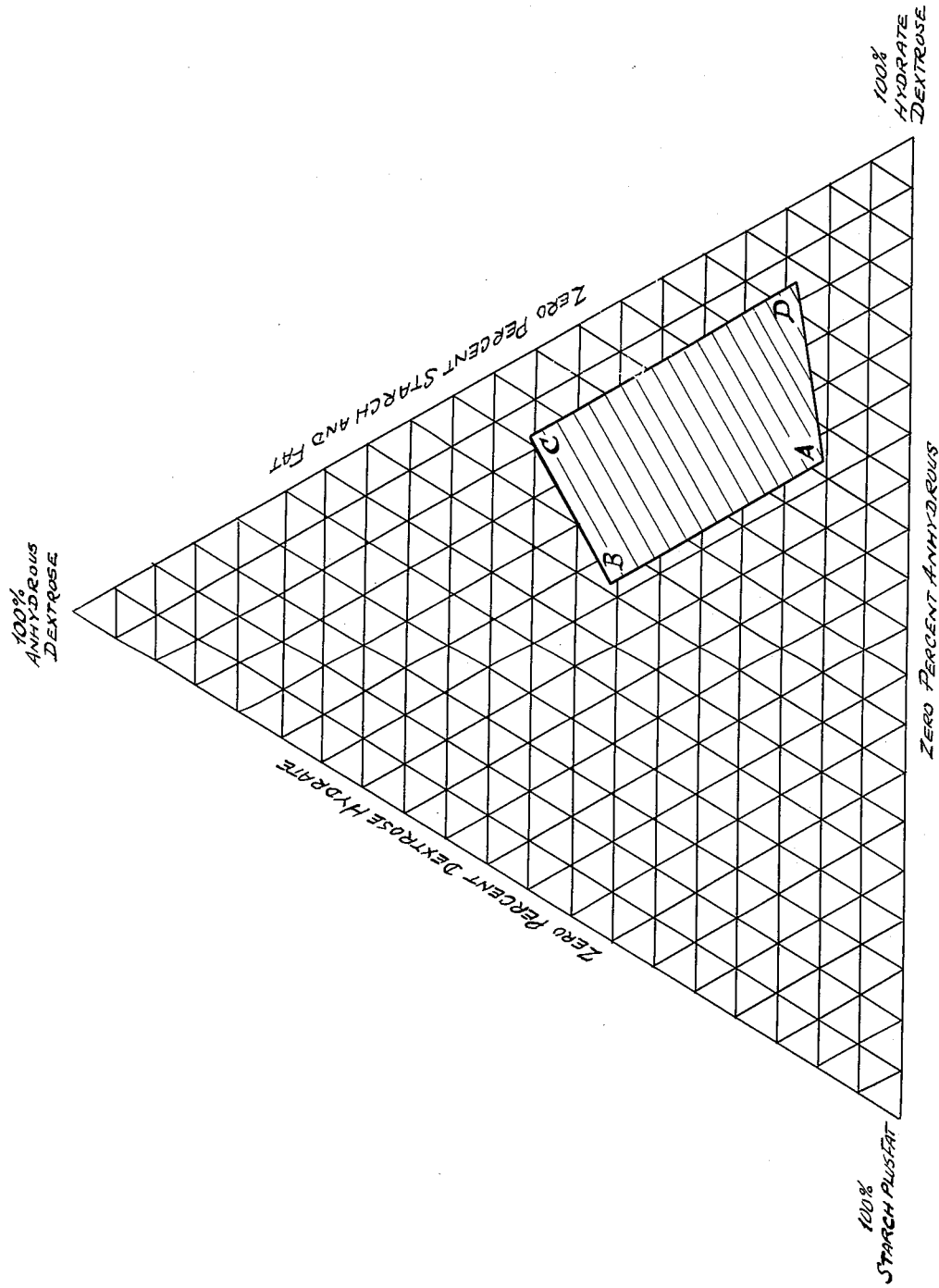
INVENTORS
ZENAS BLOCK
GEORGE J. ROSNER
BY ABRAHAM H. GOODMAN
William R. Lieberman
ATTORNEY United States Patent Office 2,739,896
Patented Mar. 27, 1956

2,739,896
EDIBLE DUSTING COMPOSITION

Zenas Block, Larchmont, George J. Rosner, Brooklyn, and Abraham H. Goodman, Great Neck, N. Y., assignors to Doughnut Corporation of America, New York, N. Y., a corporation of New York Application June 5, 1952, Serial No. 291,962

7 Claims. (Cl. 99—92)

The present invention relates to improvements in comestibles and it relates more particularly to a novel and improved edible dusting composition.

It has long been conventional to apply a sweet powdered coating to bakery products, particularly to fried cakes such as doughnuts and the like. These coatings serve a twofold purpose in that they enhance the appearance of the fried cakes and also improve their palatability. The earlier coatings consisted essentially of powdered cane sugar, and starch such as corn starch flour or other filler type of material, and were applied to the still warm freshly fried cake. The coated cakes were then generally stored and dispensed unpackaged or otherwise exposed to normal atmospheric conditions of humidity and temperature. In such an environment, the powdered sugar and starch filler coating was adequate and acceptable in that the palatability of the cake was improved and the coating was stable, that is the powdered sugar coating maintained its initial pleasing appearance, general physical properties and covering power for prolonged periods of time, consistent with the production, distribution and consumption of the cakes. However, with the advent of modern packaging, the fried cakes are now marketed and dispensed in completely sealed moisture-proof cartons. The freshly fried cakes, while still warm and laden with moisture, are packaged and thus maintain their softness and palatability for extended periods, as a result of the highly humid ambient conditions. This high humidity, on the other hand, adversely affects the powdered sugar coating there was then employed a preparation consisting absorbed from the cake and its surroundings. As a result, the sugar coating becomes soft and sticky and acquires a slimy transparent appearance which is highly unattractive. In order to improve the stability of the coating there was then employed a prepaartion consisting of hydrated dextrose, a starchy substance and a fat, the fat serving as a protective coating for the sugars and as an agent to provide adhesion between the fried cake and dusting composition. However, these dusting compositions possessed an important drawback in that they required relatively large proportions of a starchy substance in order to achieve a useable coating of minimum acceptable stability. The necessary quantity of starchy substance needed is sufficient to impart a highly starchy taste to the coating and partially nullify its sweetness to greatly impair the palatability of the fried cake.

It is thus a principal object of the present invention to provide an improved edible coating material for comestibles.

Another object of the present invention is to provide an improved edible dusting powder for cakes and pastries, particularly fried cakes such as doughnuts.

Still another object of the present invention is to provide an improved edible dusting powder for fried cakes which produces an attractive coating of superior stability and great palatability.

A further object of the present invention is to provide an improved sweet edible dusting powder for fried cakes which is highly palatable, having no perceptive starchy taste and which produces a stable coating.

Still a further object of the present invention is to provide an improved sweet edible dusting powder which may be applied to cakes or cake doughnuts to produce an attractive coating which maintains its attractive appearance for prolonged periods even under the conditions of high humidity encountered when the cakes are packaged in moisture-proof cartons.

Another object of the present invention is to provide an improved edible dusting powder for fried cakes which produces an attractive adherent coating stable under ordinarily-met heat and humid conditions, improves the palatability of the cake and does not impair its physical qualities, said dusting powder being inexpensive and simple to apply.

The above and further objects of the present invention will become apparent from a reading of the following description taken in conjunction with the accompanying drawing, which is a three component graph representing the range of ingredients entering into the improved edible dusting composition.

The present invention broadly contemplates an improved edible dusting composition comprising a mixture of hydrated dextrose, anhydrous dextrose, and an edible fat. In addition to the above ingredients, a small amount of starch may be added to improve the consistency of the coating.

It has been discovered that anhydrous dextrose possesses the ability to remain stable and retain its attractive appearance as a doughnut coating for extended periods in the presence of the moisture of the doughnut and in highly humid surroundings. This is probably due to the anhydrous dextrose requiring relatively large amounts of water to put into solution and to impart a transparent and shiny appearance to the resulting coating. However, the anhydrous dextrose possesses the property of dehydrating the doughnut which is undesirable since this results in a dry doughnut of inferior eating qualities and reduced palatability.

It has been found that by admixing the anhydrous dextrose with hydrated dextrose, a coating may be produced of excellent hydroscopic properties, and of highly superior stability. To effect a dusting powder having acceptable dehydrating qualities, the anhydrous dextrose should be between 15% and 50% of the total dextrose present and preferably between 25% and 35%. While starch may be entirely omitted from the dusting powder, when this is done the flow properties of the powder are not particularly acceptable in application, and the product becomes gritty and loses its smooth appearance.

Where a coating of smooth consistency is desired, it has been found that the addition of as little as 4% starch and preferably 5% starch to the dusting powder inhibits any grittiness and results in a smooth-appearing product. The starch, when present in such small amounts is not perceptible and does not in any way detract from the commercial acceptability or from the palatability of the coated cake, and even when the starch is present in much larger amounts, it is barely perceptible. Superior edible dusting powders within the scope of the present invention, producing stable attractive coatings of high palatability and smooth consistency comprise anhydrous dextrose approximately 13% to 43.5% by weight, hydrated dextrose 43.5% to 74% by weight, an edible fat having a melting point between 75° F. and 138° F., from 4% to 8% by weight, and starch between 4% and 20% by weight.

It is important that the dextroses be finely divided so as to have a particle size whereby at least 55% thereof will pass through a 200 mesh sieve.

Any suitable palatable fat which is well known in the art may be employed. The melting point of the fat used in each particular case depends upon the surrounding conditions, such as climate, season of the year, etc. Although a wide range of melting points is acceptable, as set forth above, a fat having a melting point of between 100° F. and 110° F. is most generally convenient and desirable.

An example of a suitable fat is a hydrogenated coconut oil having a melting point of 110° F.

Although corn starch is preferred in the improved dusting powder, any other suitable starchy substance may be employed as is well known, such as the various disrupted and gelatinized starches.

The following table designated as Table 1, demonstrates the drying out effect of anhydrous dextrose and how this is offset by the presence of the hydrated dextrose. The softness of the test doughnuts is reflected as compressibility values which decrease with increasing quantities of anhydrous dextrose. Organoleptic tests indicate that beyond the 50% anhydrous dextrose ratio the doughnut becomes too dry for general acceptability.

TABLE NO. 1

*Effect of varying percentage of anhydrous dextrose to dextrose hydrate in edible dusting compositions*

All compositions for 5% starch and 8% fat (110° melt point). Values shown are for standard commercial doughnuts coated with a dusting powder made with varying percentage ratio of anhydrous and hydrate dextrose and held at room temperature for 24 hours.

| Anhydrous Dextrose–Hydrate Ratio | | Softness or Compressibility Value of Doughnut Taken at 24 Hours Age |
| --- | --- | --- |
| Anhydrous Dextrose | Hydrate Dextrose | |
| 0 | 100 | 216.50 |
| 5 | 95 | 213.25 |
| 10 | 90 | 209.75 |
| 15 | 85 | 206.50 |
| 20 | 80 | 203.25 |
| 25 | 75 | 200.00 |
| 30 | 70 | 196.50 |
| 35 | 65 | 193.25 |
| 40 | 60 | 190.00 |
| 45 | 55 | 196.75 |
| 50 | 50 | 183.25 |
| 55 | 45 | 180.00 |
| 60 | 40 | 176.25 |
| 65 | 35 | 173.25 |
| 70 | 30 | 170.00 |
| 75 | 25 | 167.75 |

The following table designated as Table No. 2 shows the relative stability of coatings of various dusting powders as applied to cake doughnuts and held in moisture proof boxes at 95° F. for 24 hours. This data demonstrates the value of anhydrous dextrose in improving the stability characteristics of anhydrous dextrose containing coatings. It should be noted that the higher anhydrous dextrose ratios over 50% give excellent coating stability and results, but are not generally acceptable because of the excessive drying out tendencies (see Table No. 1).

The drawing represents a triangular chart whose three components are (1) Percent anhydrous dextrose, (2) Percent hydrated dextrose, and (3) Percent fat and starch. The preferable range of fat being between 4% and 8% and of starch between 4% and 20%, the range of the combination of these two is between 8% and 28%. The shaded area defined by the points A, B, C and D represents the range of preferred proportions of the ingredients entering into the present improved edible dusting composition, as set forth earlier, that is (1) anhydrous dextrose—13.05% to 43.5% by weight, (2) hydrated dextrose—43.5% to 73.95% by weight, (3) fat 4% to 8%, and (4) starch—4% to 8%. It should be understood that where other than the usual desirable properties of the dusting powder are sought after, these proportions may be modified. For example, if a crystalline rather than a smooth coating is desired, the starch may be entirely omitted. Furthermore, other ingredients may be added, such as suitable coloring and flavoring materials.

The present improved edible dusting powder may be compounded in any suitable manner well known in the art.

While there has been described and illustrated preferred embodiments of the present invention, it is apparent that numerous alterations and omissions may be made without departing from the spirit thereof.

The present application is a continuation-in-part of the co-pending application of Zenas Block, George Rosner, and Abraham H. Goodman, Serial No. 161,738, filed May 12, 1950.

We claim:

1. An edible dusting powder comprising 15 to 50 parts anhydrous dextrose, 50 to 85 parts hydrated dextrose and 4 to 8 parts of edible fat.

2. An edible dusting composition comprising 13% to 43.5% by weight anhydrous dextrose, 43.5% to 74% by weight hydrated dextrose, 4% to 8% by weight edible fat, and 4% to 20% by weight of starch.

3. An edible dusting composition as claimed in claim 2, wherein said edible fat has a melting point of between 75° F. and 138° F.

4. An edible dusting composition as claimed in claim 2, wherein said starch comprises approximately 5% by weight of said composition.

5. An edible dusting composition as claimed in claim 2, wherein said dextrose is of a particle size permitting at least 55% thereof to pass through a 200 mesh sieve.

6. An edible dusting composition as claimed in claim 2, wherein said anhydrous dextrose forms between 25% and 35% of the total dextrose present.

7. An edible dusting composition as claimed in claim 2, wherein said edible fat is present in substantially 8%

TABLE NO. 2

*Stability of edible dusting powders on doughnuts*

[Coated Doughnuts held in moisture-proof boxes for 24 hours at 95° Fahrenheit.]

| Percent Ratio of Sugar Present, Anhydrous to Hydrate Dextrose | Actual Composition | | | | Stability Rating | Appearance | Condition of Coating on Top of Donuts | Condition of Coating Between Donuts | Starch Taste |
| --- | --- | --- | --- | --- | --- | --- | --- | --- | --- |
| | Percent Starch | Percent Fat (110° F. M. P.) | Percent Anhydrous Dextrose | Percent Hydrate | | | | | |
| 75% Anhyd. to 25% Hyd. | 5 | 8 | 65.25 | 21.75 | 1st | excellent plus++ | excellent plus++ | excellent plus++ | none. |
| 65% Anyd. to 35% Hyd. | 5 | 8 | 56.55 | 30.45 | 2nd | do | do | do | Do. |
| 55% Anhyd. to 45% Hyd. | 5 | 8 | 47.85 | 39.15 | 3rd | excellent plus+ | excellent plus+ | excellent plus+ | Do. |
| 45% Anhyd. to 55% Hyd. | 5 | 8 | 39.15 | 47.85 | 4th | excellent | excellent | excellent | Do. |
| 35% Anhyd. to 65% Hyd. | 5 | 8 | 30.45 | 56.55 | 5th | very good plus | very good plus | very good plus | Do. |
| 25% Anhyd. to 75% Hyd. | 5 | 8 | 21.75 | 65.25 | 6th | very good | very good | very good | Do. |
| 15% Anhyd. to 85% Hyd. | 5 | 8 | 13.05 | 73.95 | 7th | good | good | good | Do. |
| 100% Hyd. | 20 | 8 | 0 | 72 | 8th | do | do | good minus | strong. |
| 100% Hyd. | 15 | 8 | 0 | 77 | 9th | good minus | good minus | fair plus | fairly strong. |
| 100% Hyd. | 10 | 8 | 0 | 82 | 10th | fair | fair | fair | mild. |
| 100% Hyd. | 5 | 8 | 0 | 87 | 11th | fair minus | fair minus | poor | none. |
| 100% Hyd. | 0 | 8 | 0 | 92 | 12th | poor | poor | very poor | Do. | by weight, and has a melting point between 100° F. and 110° F.

References Cited in the file of this patent
UNITED STATES PATENTS

| | | |
|---|---|---|
| 2,012,506 | Griffith | Aug. 27, 1935 |
| 2,129,859 | Miner | Sept. 13, 1938 |
| 2,144,371 | Griffith et al. | Jan. 17, 1939 |
| 2,145,662 | Miner et al. | Jan. 31, 1939 |